Patented Jan. 5, 1937

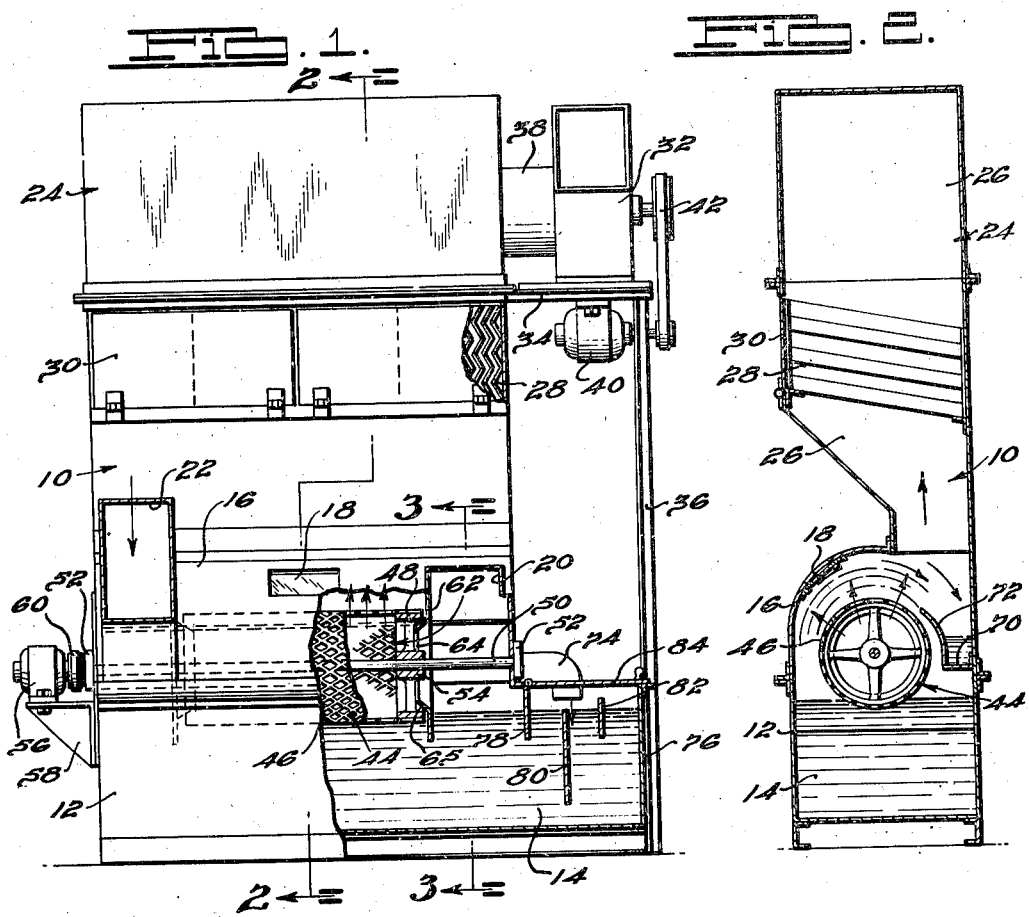
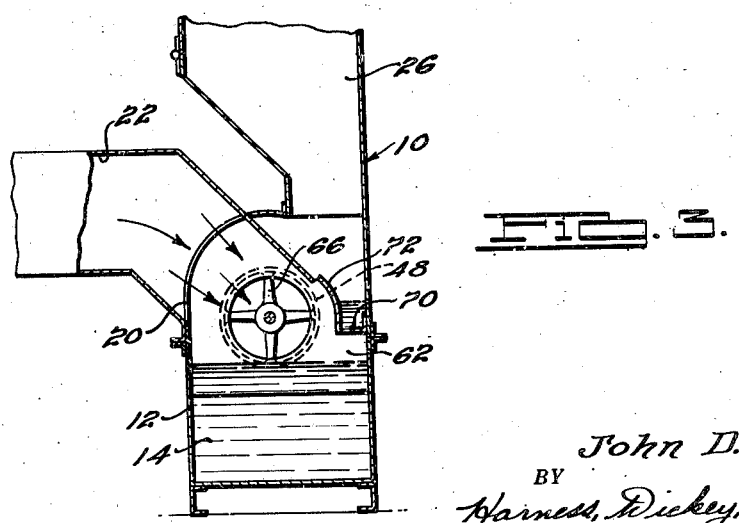

2,066,913

UNITED STATES PATENT OFFICE 2,066,913

APPARATUS FOR REMOVING FOREIGN MATERIAL FROM AIR

John D. Schmieg, Detroit, Mich.

Application August 10, 1936, Serial No. 95,057

6 Claims. (Cl. 261—92)

This invention relates to an apparatus for removing foreign material, such as paint, lacquer, enamel, and dust, or the like, from air.

The main object of the present invention is to effectively and completely clean air laden with foreign material in suspension by completely arresting and removing the foreign material from the air.

Another object of the invention is to provide a moving mass of liquid, such as water, of such a character that air laden with foreign material in suspension passed through the path of the liquid will have the foreign material completely removed therefrom. Other liquids which are capable of use with the present invention are oils, caustics, and acids, or the like, and the reference to water is to be considered as illustrative only.

Other objects of the invention are to provide an apparatus capable of creating the moving mass of liquid of the required character and so constructed that the air laden with foreign material may be entirely passed through the liquid; and to provide an apparatus, of the type to be described, which is adapted for use in various types of industrial plants, such, for example, as paint plants, using the spray method of painting, and power houses and foundries, in which air laden with sand, fly ash, and dust is common, and which is adapted for a wide range of conditions in such plants.

Other objects of the invention will become apparent from the following specification, the drawing relating thereto, and from the claims hereinafter set forth.

In the drawing, in which like numerals are used to designate like parts in the several views throughout;

Figure 1 is a front elevational view, with parts broken away, showing parts in section of an apparatus illustrating an embodiment of the present invention;

Fig. 2 is a vertical cross-sectional view taken substantially along the line 2—2 of Fig. 1, and Fig. 3 is a vertical cross-sectional view taken substantially along the line 3—3 of Fig. 1.

It is recognized that various apparatuses have been provided for removing paint and dust held in suspension in air from the air, and one type of such apparatus provides a conduit through which the air carrying the foreign material in suspension is passed, and within which a spray of water is provided directed against the stream of air. The difficulty with such a prior type of construction is that the character of the spray is such that the air is not completely washed and the foreign material is not completely removed therefrom.

The present invention overcomes the difficulties of prior constructions by providing a violently agitated moving mass of water having novel characteristics and passing the air laden with foreign material in suspension through the moving mass of water.

The present invention has particular utility in removing paint in suspension in air from the air, and the embodiment of the invention illustrated in the drawing is particularly adaptable for removal of such paint; but it is to be understood that the method and apparatus described has also general utility for removing foreign material, such as dust and sand, or the like, from air in which the foreign material is held in suspension.

It is at present the practice in painting articles, such as automobile bodies, to place the article within an enclosed booth and apply the paint to the article by the spray method. In using this spray method, the air within the booth becomes laden with small particles of paint in suspension, and it is for the removal and reclaiming of the paint from the air that the method and apparatus described are adapted.

In the embodiment of the invention, illustrated in the drawing, an enclosed cabinet 10, preferably formed of sheet metal material, is provided, in which a lower portion 12 provides a receptacle for a bath of water 14. The rear wall of the cabinet is substantially straight and the front wall above the receptacle 12 is curved, as at 16, the curved wall 16 extending longitudinally of the front face of the cabinet 10. The front face 16 is preferably provided with a transparent window 18, so that the interior of the cabinet may be viewed from the outside. An opening 20 is provided at each end of the curved wall 16 for communication with the inside of the cabinet. Conduits 22 are provided over each of the openings of such a size and shape that they extend to and communicate with the interior of the paint spray booth, or other quarters, within which the air laden with foreign material is located for placing the paint spray booth in communication with the interior of the receptacle 10. It is contemplated that both conduits may communicate with a single booth, or each conduit may communicate with separate booths depending upon the capacity of the apparatus and the size of the booths.

The upper portion 24 of the cabinet 10 forms an exhaust conduit 26 communicating with the lower portion and through which the cleaned air is exhausted to the outside. The exhaust conduit 26 is preferably provided with vertically extending zig-zag baffles 28 at spaced intervals across the exhaust conduit 26 sloping downwardly and rearwardly for rapidly changing the direction of travel of the exhausted air and removing any moisture included in the air which may have been carried into the exhaust conduit. It has been found as the result of tests over an extended period that the air within the exhaust conduit 26 is completely cleaned; and any water entrained with the exhausted air is removed from the air within the baffles and returned to the bath. In order to clean out the baffles, doors 30 are provided in the front face of the cabinet over the zig-zag baffles, so that upon opening the doors, the baffles are readily accessible for thorough cleaning.

A blower 32 of conventional construction is mounted on a platform 34 supported by vertical uprights 36 adjacent the top and one end of the cabinet 10 and is in communication with the cabinet and with the exhaust conduits 26 by means of a communicating conduit 38. The blower 32 is driven by a motor 40 suitably mounted on the platform 34 and operatively connected to the blower 32 by means of a conventional belt and pulley arrangement 42.

In order to create a moving mass of water having the desired characteristics through which the air laden with foreign material is passed, a rotatable hollow member 44, open at its ends, is mounted within the lower portion of the cabinet 10. The member 44 comprises a substantially cylindrical hollow portion 46 formed of expanded metal, the cylindrical portion 46 being mounted on pulleys 48, one pulley 48 being provided at each end of the cylindrical portion 46, the pulleys being suitably connected to the inner surface of the portion 46 adjacent its ends. The rotatable member 44 is mounted within the cabinet 10 by means of a shaft 50, which is arranged substantially horizontally and extends through openings in the sides of the cabinet 10 and is mounted for rotation in bearings 52 suitably secured to the outer surfaces of the ends of the cabinet in alignment with the openings in the ends. The shaft 50 extends through the hubs 54 of the pulleys 48 which are suitably keyed thereto for rotation with the shaft 50. The shaft 50 is driven by a motor 56 mounted upon a bracket 58 offset to one side of the shaft 50 and connected thereto by means of a conventional belt and pulley mechanism 60.

The rotating member 44 is located longitudinally on the shaft, so that the ends of the member 44 are adjacent to the inner edges of the openings 20. A separating plate 62 is provided adjacent each inner edge of the openings 20 and has an opening 64, with a bent annular portion 65, substantially the same size as the periphery of the rotating member 44 adjacent the ends of the rotating member 44, so that the air entering the receptacle through the conduit 22 is confined in its passage into the cabinet and enters the open ends of the cylindrical member. It is evident upon an inspection of the drawing and from the above description that the cylindrical member 44 is open at its ends through the spaces between the arms 66 of the pulleys 48, and that air entering through the conduit 22 is confined to communication with the interior of the cabinet through the open ends of the cylindrical member by means of the separating plates 62.

In order to provide a moving mass of water of the desired characteristics, the water 14 within the receptacle 12 is maintained at such a level that the top surface of the water extends above the lower edge of the rotatable member 44, as indicated in the drawing. Upon rapid rotation of the cylindrical member 44 within the bath, a violently agitated moving free mass of water is produced in that portion of the cabinet 10 between the outer periphery of the cylindrical member 44 and the inner surface of the curved portion 16 of the cabinet. The character of this mass of water is such that a thin film of water constantly tends to form over the outer periphery of the rotating member 44 and large quantities of water are violently thrown against the inner surface of the curved portion 16, creating a violently agitated free mass of moving water. The direction of rotation of the cylindrical member 44, in the embodiment illustrated, is clockwise and the direction of movement of the mass of water caused by the rotation of the member 44 is in the direction of the curved arrows, indicated in Figure 2.

The operation of the apparatus so far described is as follows:

Motors 40 and 56 are started and start operation of the blower 32 and rotation of the cylindrical member, respectively. The operation of the blower 32 creates a suction in the upper end of the cabinet 10 and causes air laden with foreign material to pass through the conduit 22 from the paint booth, or other confining space, into the interior of the receptacle 10 through the open ends of the cylindrical member 44, then to the interior of the member 44, and then causes the air to pass through the openings in the expanded sheet metal portion 46, through the violently agitated free mass of water, and out through the exhaust conduit 26. Rotation of the cylindrical member 44 creates the violently agitated free mass of the water of the character described, and as the air laden with the foreign material passes through this mass of water, the foreign material, such as paint, is removed therefrom and is carried by the moving mass of water to one side of the cabinet 10 within the lower portion thereof. The cleaned air is carried upwardly within the exhaust conduit 26 through the passages formed by the zig-zag baffles 28, out through the conduit 38, and blower 32, to the atmosphere.

A sludge trough 70, preferably formed of metal and having a portion 72 spaced from and substantially concentric to the outer periphery of the rotatable member 44, is provided adjacent the side of the cabinet against which the water and paint are thrown. This trough collects the water and paint therein to carry them outside of the cabinet and discharge them through a downwardly directed spout 74 into an extension 76 provided adjacent one end of the receptacle portion 12 of the cabinet. The paint and water are discharged into the extension 76, which is in communication with the bath 14. The upper surface of the water and paint within the extension 76 is separated from the bath 14 by means of baffles 78, 80, and 82, and as the paint is lighter than water, it will float on the surface of the bath within the extension 76 and permit the return and recirculation of the clean water from the extension 76 to the bath 14. A door 84 is preferably provided over the top of the extension 76 and may be raised to skim off and reclaim the paint collected therein. It is pointed out that, to adapt this portion of the apparatus to use when dust or sand is being withdrawn from the air, all that is necessary is to place the baffles adjacent the bottom of the extension, as sand and dust would sink to the bottom and this would allow recirculation of the clean water in the upper portion of the bath within the extension.

Formal changes may be made in the specific embodiment of the invention described without departing from the spirit and substance of the broad invention, the scope of which is commensurate with the appended claims.

What is claimed is:

1. Apparatus for removing foreign material such as paint, dust, or the like, from air laden with foreign material in suspension comprising a receptacle containing a bath of liquid, a rotatable hollow substantially cylindrical member mounted within said receptacle with its longitudinal axis substantially horizontal and with a portion thereof extending into said bath, said cylindrical member having openings therethrough, a conduit communicating with the interior of said receptacle and with the interior of said hollow cylindrical member, means for rotating said rotatable member to create a violently agitated free mass of liquid over the exposed portion of said cylindrical member and to throw the liquid to one side of said receptacle, an exhaust conduit communicating with said receptacle above said free mass of liquid, means for drawing said air laden with foreign material through said first-named conduit through the openings in said cylindrical member and through said violently agitated free mass of liquid to remove the foreign material from the air, whereby said foreign material is carried with said mass of liquid to said one side of said receptacle, and a trough within said receptacle along said one side of said receptacle for receiving said mass of liquid and said foreign material and carrying it outside of said receptacle.

2. Apparatus for removing foreign material such as paint, dust, or the like, from air laden with foreign material in suspension comprising a receptacle containing a bath of liquid in the lower portion thereof, a rotatable hollow substantially cylindrical member mounted within said receptacle with its longitudinal axis substantially horizontal and with a portion thereof extending into said bath, said member having openings therethrough, said receptacle having a wall portion spaced from and substantially concentric to the surface of said hollow cylindrical member, a conduit communicating with the interior of said receptacle and with the interior of said hollow cylindrical member, means for rotating said rotatable member to create a violently agitated free mass of liquid between the exposed portion of said cylindrical member and the concentric portion of said receptacle and to throw the liquid to one side of said receptacle, and upwardly extending exhaust conduit communicating with said receptacle above said free mass of liquid adjacent said wall portion and intercepting said wall portion at such an angle as to cause the air to make a sharp upward turn, means for drawing said air laden with foreign material through said first named conduit, through the openings in said cylindrical member, and through said violently agitated free mass of liquid to remove the foreign material from the air.

3. Apparatus for removing foreign material such as paint, dust, or the like, from air laden with foreign material in suspension, comprising an elongated receptacle containing a bath of liquid in the lower portion thereof, a rotatable hollow substantially cylindrical member mounted within said receptacle with its longitudinal axis substantially horizontal and extending longitudinally of said elongated receptacle and with a portion thereof extending into said bath, said cylindrical member having openings therethrough, said elongated receptacle having a portion spaced from and substantially concentric to the surface of said cylindrical member, an opening adjacent each end of said spaced portion, conduits communicating with said openings with the interior of said receptacle and the interior of said hollow cylindrical member, means for rotating said rotatable member to create a violently agitated free mass of liquid between the exposed portion of said cylindrical member and said spaced portion of said receptacle and to throw the liquid to one side of said receptacle, an exhaust conduit communicating with said receptacle above said free mass of liquid, means for drawing said air laden with foreign material through said first named conduit, through the openings in said cylindrical member, and through said violently agitated free mass of liquid to remove the foreign material from the air.

4. Apparatus for removing foreign material such as paint, dust, or the like, from air laden with foreign material in suspension comprising a receptacle containing a bath of liquid in the lower portion thereof, a rotatable hollow substantially cylindrical member mounted within said receptacle with the lower portion thereof extending into said bath, said member having openings therethrough, said receptacle having a side wall portion spaced from said hollow cylindrical member and directed inwardly above said hollow cylindrical member, means for rotating said rotatable member to create a violently agitated free mass of liquid between the exposed portion of said cylindrical member and said side wall and to throw the liquid to the other side of said receptacle, an upwardly extending exhaust conduit communicating with said receptacle above said free mass of liquid adjacent said wall portion and intercepting said wall portion at such an angle as to cause the air to make a sharp upward turn, and means for drawing said air laden with foreign material through said first named conduit and through said mass of liquid to remove the foreign material from the air and thereafter exhaust the cleaned air.

5. Apparatus for removing foreign material such as paint, dust, or the like, from air laden with foreign material in suspension comprising an elongated receptacle containing a bath of liquid, a rotatable member within the main portion of said receptacle having openings therethrough and having a portion extending into said bath, a baffle having a portion thereof within said bath partially separating said bath into a main portion and an auxiliary portion and permitting circulation between said main portion and said auxiliary portion, means to rotate said rotatable member to create a violently agitated free mass of liquid and to throw the liquid to one side of said receptacle, and means for drawing said air laden with foreign material through said free mass of liquid to remove the foreign material therefrom.

6. Apparatus for removing foreign material such as paint, dust, or the like, from air laden with foreign material in suspension comprising an elongated receptacle containing a bath of liquid, a rotatable member within the main portion of said receptacle having openings therethrough and having a portion extending into said bath, said receptacle extending beyond one end of said rotatable member, a baffle having a portion thereof within said bath partially separating the extending portion of said receptacle from the main portion thereof, means to rotate said rotatable member to create a violently agitated free mass of liquid and to throw the liquid to one side of said receptacle, means for drawing said air laden with foreign material through said free mass of liquid, and a trough within said receptacle along one side thereof and extending to said extending portion of said receptacle for receiving said liquid and said foreign material and carrying them to said extending portion.

JOHN D. SCHMIEG.